US005490079A

United States Patent [19]
Sharpe et al.

[11] Patent Number: 5,490,079
[45] Date of Patent: Feb. 6, 1996

[54] SYSTEM FOR AUTOMATED TOLL COLLECTION ASSISTED BY GPS TECHNOLOGY

[75] Inventors: Claude A. Sharpe, McKinney; Robert P. Lindsley, Lucas, both of Tex.

[73] Assignee: Texas Instruments Incorporated, Dallas, Tex.

[21] Appl. No.: 293,352

[22] Filed: Aug. 19, 1994

[51] Int. Cl.$^6$ .................................................. G07B 15/00
[52] U.S. Cl. .......................... 364/467; 364/449; 364/452; 455/54.1
[58] Field of Search ................................. 364/449, 452, 364/464.01, 467, 401, 460; 342/357, 457; 455/53.1, 54.1, 49.1, 99

[56] References Cited

U.S. PATENT DOCUMENTS

| | | | |
|---|---|---|---|
| 4,819,174 | 4/1989 | Furuno et al. | 364/444 |
| 5,014,206 | 5/1991 | Scribner et al. | 364/449 |
| 5,068,656 | 11/1991 | Sutherland | 340/989 |
| 5,101,200 | 3/1992 | Swett | 340/937 |
| 5,119,102 | 6/1992 | Barnard | 342/357 |
| 5,253,162 | 10/1993 | Hassett et al. | 364/405 |
| 5,289,183 | 2/1994 | Hassett et al. | 340/905 |
| 5,310,999 | 5/1994 | Claus et al. | 235/384 |
| 5,327,347 | 7/1994 | Hagenbuch | 364/424.07 |
| 5,376,943 | 12/1994 | Blunden et al. | 343/795 |
| 5,414,624 | 5/1995 | Anthonyson | 364/424.01 |
| 5,422,473 | 6/1995 | Kamata | 235/384 |
| 5,424,727 | 6/1995 | Shieh | 340/928 |

*Primary Examiner*—Michael Zanelli
*Attorney, Agent, or Firm*—James C. Kesterson; Richard L. Donaldson

[57] ABSTRACT

A system for automated toll collection which utilizes Global Positioning System technology. The invention includes a Toll Tag 24 which comprises GPS sensor 32, signpost sensor 36, gatekey transmitter 38, and processing & recording module 40. Module 40 is comprised of memory 30 storing known toll location, computer or toll area detector 34, memory for time and location 42, and time clock 44. Once computer 34 determines that a toll area has been entered, it records the entry in memory 42 and activates transmitter 38 to send a signal to sentry receiver 52 which communicates same to toll authority exchange 26.

13 Claims, 2 Drawing Sheets

TOLL TAG INTERNAL DETAIL

SYSTEM FOR AUTOMATED TOLL COLLECTION ASSISTED BY GPS TECHNOLOGY

BACKGROUND OF THE INVENTION

1. Field of the Invention

The present invention relates to a system for automated toll collection which automatically tracks charges wherever fees are charged for entering predetermined geographical locations. More specifically, the invention relates to an automated toll collection system which uses Global Positioning System ("GPS") technology to lower costs.

2. Related Art

Specifications for automatic toll collection systems currently under development call for the use of radio frequency ("RF") devices. These systems typically consist of a large toll plan containing a large metal structure spanning all lanes of traffic. A radio frequency ("RF") reader is installed over each lane of traffic and supported by the large metal structure. The RF reader is linked to a computer which collects the raw data and sorts incoming data from the multiple lanes of traffic. The computer communicates with a central processing area where additional computers perform accounting operations. It should be noted that the RF reader is generally hardwired to the computer and is thus susceptible to lightning.

As currently contemplated by designers, a vehicle is equipped with a Toll Tag device having a modulated reflector. As the vehicle moves through the toll plaza, the RF reader illuminates passing vehicles with powerful RF energy. As the RF reader illuminates the vehicle, a modulated reflection signal is produced by the modulated reflector and is used to transmit the identity of the vehicle to the toll booth reader. In this manner, the positively-identified vehicle is charged a toll automatically without stopping and without any directed effort on the part of the driver.

Such systems which utilize frequencies typically of L-band or higher in order to exploit high data rates are currently under development. Common to these systems is the requirement of expensive, weatherproof reader equipment.

Accordingly, it is clear that modem specifications currently under consideration require costly equipment. The toll plazas are obviously not portable as extensive infrastructure is required. The large metal structures for holding the RF readers must be anchored to the ground in a way which will avoid collapse during earthquake. In addition, the RF energy produced by the RF reader may be powerful enough to raise concerns by certain segments of the public concerned with cancer health risks. Therefore, there is a need to overcome the limitations of cost created by: a need for extensive infrastructure, a need to overcome certain limitations imposed by nature, and a need to reduce the broadcast power of RF energy.

SUMMARY OF THE INVENTION

It is in view of the above problems that the present invention was developed. The invention is a system for automated toll collection using GPS navigation technology. Specifically, a Toll Tag which is mounted in a vehicle is equipped with a location sensor, preferably a GPS sensor suitable for receiving a signal of a first frequency, such as for example only, 1.5 GHz (gigahertz), which provides the ability to determine location in addition to the typical identification information. The Toll Tag of the present invention also stores in memory the location of all toll areas which are served. Therefore, a computer in the Toll Tag may compare the locations of both of the foregoing to determine whether the vehicle has entered a toll area.

The advantage to this approach is that the Toll Tag itself will generate a signal representative of the vehicle identification when it determines that it is within or approaching a toll area as opposed to reliance on powerful continuous electromagnetic broadcasts from RF readers and modulated reflected signals from the Toll Tag to identify the vehicle. The signal generated by the Toll Tag is received by a receiver at the toll area which can record the information relative to the passage, the time, etc. for accounting purposes and/or could also write the transaction to the Toll Tag. The signal emitted from the Toll Tag is produced by a transmitter, which operates at a second frequency, such as for example, 915 MHz (megahertz) and activates the receiver to record and/or write the transaction for accounting purposes.

In an alternative embodiment, a transmitter operating at a third frequency, such as for example, 134 KHz (kilohertz) may be utilized external of the vehicle to assist a second location sensor within the Toll Tag in recognizing the geographical location of the vehicle. Once the position of the vehicle is known and it is determined that the vehicle is within a toll location, the transmitter on the Toll Tag initiates contact with the receiver at the toll area in order to record the transaction and/or write the transaction to the Toll Tag.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
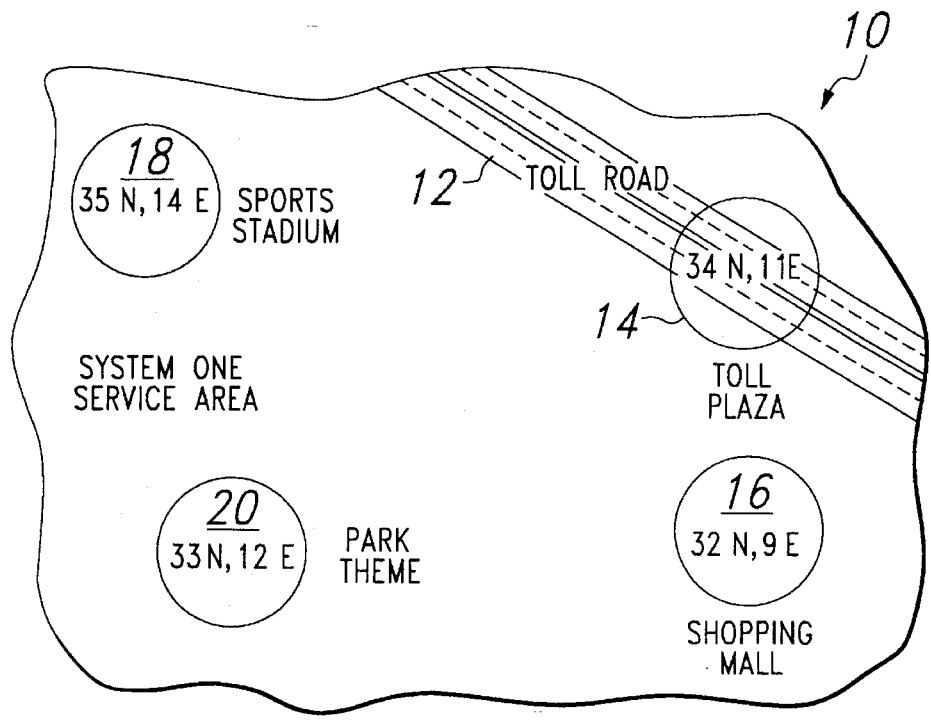
FIG. 1 illustrates toll areas within a service area.

Referring to the accompanying drawings in which like reference numbers indicate like elements, FIG. 1 illustrates a service area, shown generally at 10, and various toll areas, 12, 14, 16, 18, and 20, therein. Specifically, a toll road is indicated at 12 and toll plaza is indicated at 14. Similarly, a shopping mall is indicated at 16; a sports stadium is indicated at 18; and a theme park is indicated at 20. Accordingly, the present invention may comprehend all activities which take place within a finite, predetermined geographical boundary.

Figure 2:
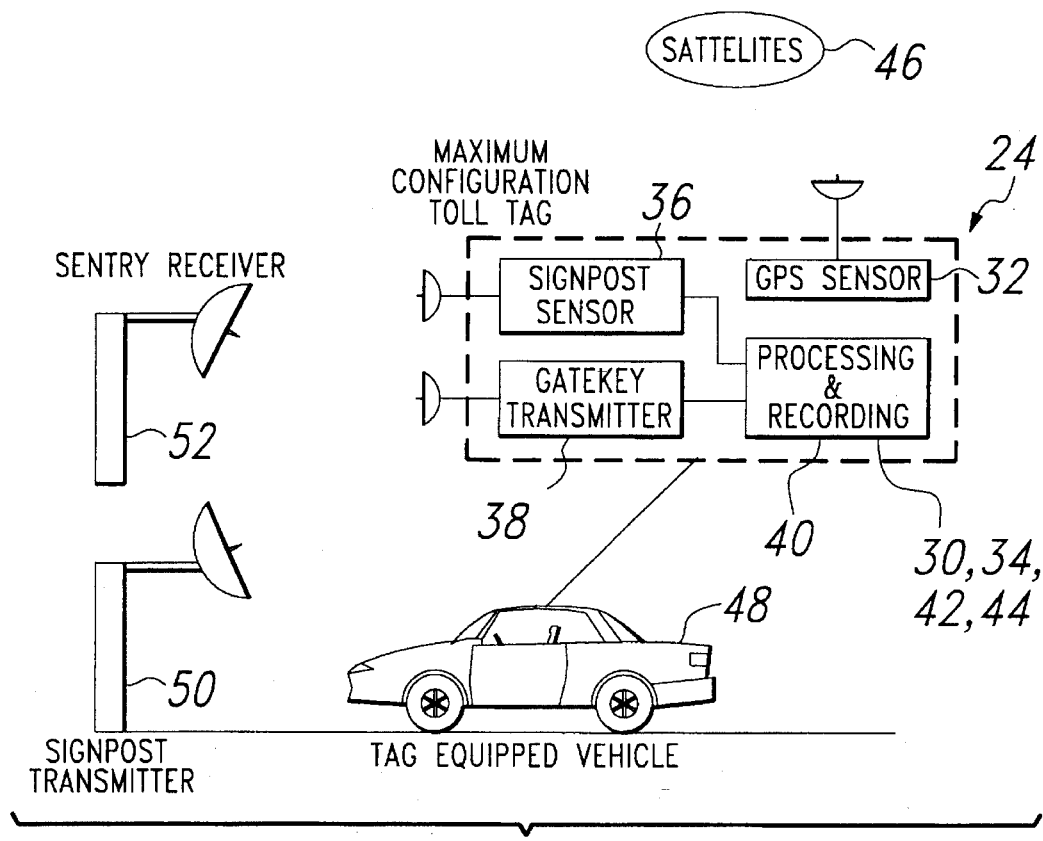
FIG. 2 illustrates the maximum system installation within a toll area.
Figure 3:
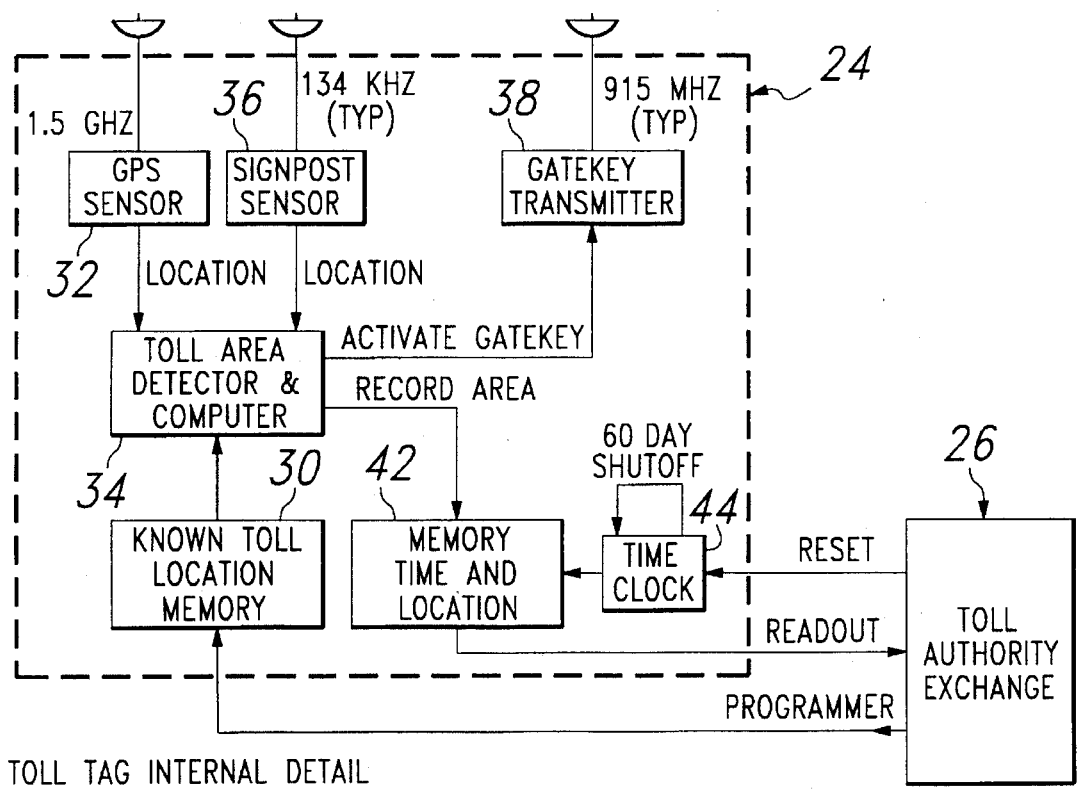
FIG. 3 illustrates in greater detail the relationship between different components within the Toll Tag and the relationship between the Toll Tag and the toll authority exchange.

FIGS. 2 and 3 facilitate discussion of the best mode of the present invention within any of the aforementioned toll areas located within service area 10. A Toll Tag is indicated generally at 24. In addition to providing typical vehicle identification information the toll Tag 24 must perform certain essential functions: determine its position by the use of external sensors; store information identifying all toll areas within service area 10 in memory; compute to determine whether the Toll Tag is located within a toll area; and the capability to generate and transmit a signal, such as for example only, a frequency of about 915 MHz (megahertz), when the Toll Tag is within a toll area.

In operation, the owner of vehicle 48 obtains and mounts Toll Tag 24 into vehicle 48. As vehicle 48 changes location, GPS sensor 32 receives location information at a first frequency, such as for example, of about 1.5 GHz (gigahertz) from GPS satellite 46.

In the first embodiment, this location information is forwarded to a processing and recording module 40 which comprises, specifically, memory containing known toll locations 30 which are predetermined, computer or toll area detector 34, memory for time and location 42 and time clock 44. Computer 34 of processing and recording module 40 compares the location information received from GPS satellite 46 via GPS sensor 32 with first memory 30 containing the coordinates known toll locations. Once computer 34 of processing and recording module 40 determines that a toll area has been entered, entry into the toll area is recorded in second memory 42 of processing and recording module 40 with time and location information. It is noted that time information is received from time clock 44 in order to complete recordation of information.

Once computer or toll area detector 34 determines that entry into a toll area is imminent, computer 34 activates Transmitter 38, (which hereinafter may be referred to as a Gatekey Transmitter). Transmitter 38 sends a signal at a second frequency, such as for example, 915 MHz (megahertz) to a receiver 52 which hereinafter may be referred to as a Sentry Receiver at the toll area that a tag-equipped vehicle is present and operating. Because Toll Tag 24 itself generates the signal to Sentry Receiver 52 on a selective basis, use of an RF reader with a powerful continuous broadcast is eliminated. Further, the need for a large metal support structure is also eliminated as the need for the RF reader no longer exists. Accordingly, the present invention reduces cost by avoiding the need for expensive reader and expensive structures. Computer 34 may also activate some visual or aural stimulus to indicate to the vehicle owner that a toll area has been entered.

It should be noted that the Toll Tag 24 may successfully operate and interact with Sentry Receiver 52 at vehicle 48 speeds approaching 70 miles per hour. Accordingly, a tag-equipped vehicle 48 offers a considerable savings of time in that vehicle speed need not be reduced in order to engage in a toll transaction.

At the end of a predetermined period of time, e.g., 60 days, time clock 44 is programmed to switch Toll Tag 24 to an inoperative state, however, time clock 44 may be reset by Toll Authority Exchange 26 upon proper payment of previous tolls, which previous toll information may be supplied by a download of memory 42.

It is recognized, however, that GPS has system limitations in certain terrain because obstructions in line of sight to satellite 46 causes shadowing and loss of signal lock in certain areas. If a toll area is located in one of these "shadowy" areas, location sensor 32 will be unable to provide computer 34 with proper vehicle 48 location information. Accordingly, it would be necessary to augment the operation of Toll Tag 24 by means of another location sensor 36 which operates at a third frequency, such as for example, 134 KHz (kilohertz). The location sensor 36 may hereinafter be referred to as a Signpost Sensor. A transmitter 50, hereinafter sometimes referred to as a Signpost Transmitter is a low-powered device which continually broadcasts a fixed code which informs passing vehicles 48 of its location. Signpost Sensor 36 receives the fixed code broadcast from Signpost Transmitter 50. The location code is communicated from Signpost Sensor 36 to computer toll area 34 in order to provide the location information unavailable from location sensor 32. Once the location information is received, Toll Tag 24 resumes its normal operation as described above.

In view of the foregoing, it will be seen that several advantages over the prior art are achieved.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, GPS location sensor 32 may be replaced in favor of a sensor operating on the LORAN System. In addition, first memory 30 and second memory 42 may be physically co-located within a single integrated chip. Thus, the breadth and scope of the present invention should not be limited by any of the above-described exemplary embodiments, but should be defined only in accordance with the following claims appended hereto and their equivalents.

What is claimed is:

1. An automated System for determining a toll amount comprising:

a remote transmitter for transmitting signals representative of geographical locations;

a toll tag located in a vehicle comprising a location sensor for receiving said signals representative of the geographical position of said vehicle; a first memory for storing information representing predetermined geographical locations; a computer in communication with said first memory and said location sensor for comparing the geographical location signals with said stored information representing said predetermined geographical locations, and a transmitter responsive to said computer for generating a signal representative of the identity of the toll tag when said computer determines a match exists between said geographical location signals and said predetermined geographical locations; and a receiver for receiving said signals from said toll tag transmitter.

2. The system of claim 1 wherein said toll tag further comprises a time clock and a second memory for storing the matched location and the rime said match occurred, and wherein said toll tag transmitted signals are further representative of said matched location and said time.

3. The device according to claim 2 wherein said first and second memories are co-located within the same integrated chip.

4. The system of claim 1 wherein said signals transmitted by said remote transmitter are at a first frequency and said signal transmitted by said toll tag responsive to said computer is at a second frequency.

5. The system of claim 4 wherein said toll tag further comprising a second location sensor in communication with said computer for receiving geographical location information signals from a fixed transmitter operating at a third frequency.

6. The system of claim 5 wherein said third frequency is about 134 KHz (kilohertz).

7. The system of claim 4 wherein said first frequency is about 1.5 GHz (gigahertz) and said second frequency is about 915 MHz (megahertz).

8. The system of claim 1 wherein said remote transmitter is located on a GPS satellite.

9. The system of claim 1 wherein said remote transmitter is a LORAN transmitter.

10. A method for automated determination of a toll comprising the steps of:

transmitting signals from a remote transmitter representative of a geographical location;

storing predetermined geographical location data in a first memory of a toll tag located in a vehicle;

receiving said transmitted signal at said toll tag;

comparing the geographical location received from said remote transmitter with said stored predetermined geographical location in a computer in said toll tag; and transmitting a signal from a transmitter in said toll tag when a match exists between said transmitted geographical location and said stored geographical location data representative of at least the identity of said toll tag.

11. The method of claim 10 and further comprising the steps of providing time data by said toll tag and storing data representative of any matched location and the time such location matches occurred.

12. The method of claim 10 wherein said signals transmitted by said remote transmitter are at a first frequency and said signal transmitted from said toll tag is at a second frequency.

13. The method of claim 12 and further comprising the steps of receiving geographical location information at said toll tag from a fixed transmitter operating at a third frequency.

* * * * *